United States Patent [19]

Krumpelt et al.

[11] 4,089,759

[45] May 16, 1978

[54] METHOD FOR IMPROVING SELECTIVITY OF MEMBRANES USED IN CHLOR-ALKALI CELLS

[75] Inventors: Michael Krumpelt, Riverview; Stanley Tariho Hirozawa, Birmingham, both of Mich.

[73] Assignee: BASF Wyandotte Corporation, Wyandotte, Mich.

[21] Appl. No.: 729,201

[22] Filed: Oct. 4, 1976

Related U.S. Application Data

[63] Continuation-in-part of Ser. No. 619,606, Oct. 6, 1975, abandoned.

[51] Int. Cl.$^2$ ................... C25B 1/16; C25B 1/26; C25B 13/08
[52] U.S. Cl. ................... 204/98; 204/128; 204/296
[58] Field of Search ................... 204/98, 296, 128

[56] References Cited

U.S. PATENT DOCUMENTS

| 3,257,334 | 6/1966 | Chen | 260/2.1 |
| 3,282,875 | 11/1966 | Connolly et al. | 260/296 |
| 3,948,737 | 4/1976 | Cook et al. | 204/128 |
| 3,969,285 | 7/1976 | Grot | 204/296 |
| 4,026,783 | 5/1977 | Grot | 204/296 |

OTHER PUBLICATIONS

"Nafion", An Electrochemical Traffic Controller, by D. J. Vaughan, DuPont Innovation, vol. 4, No. 3, Spring 1973.
"XR Perfluorosulfonic Acid Membranes" E. I. Dupont, Oct. 1, 1969.

Primary Examiner—R. L. Andrews
Attorney, Agent, or Firm—John W. Linkhauer; Robert E. Dunn; Bernhard R. Swick

[57] ABSTRACT

Membranes for use in chlor-alkali cells, made of a copolymer of tetrafluoroethylene and sulfonylfluoride perfluorovinyl ether, have their selectivity improved, with resulting substantial decrease in consumption of electric power per mole of sodium hydroxide produced, by being heat-treated at 100 to 275° Centigrade for several hours to four minutes. The current efficiency is substantially increased, and the power consumption, per unit of sodium hydroxide produced, is usually decreased by about 10 percent or more.

10 Claims, No Drawings

METHOD FOR IMPROVING SELECTIVITY OF MEMBRANES USED IN CHLOR-ALKALI CELLS

CROSS-REFERENCE TO RELATED APPLICATION

This application is a continuation-in-part of our co-pending application, Ser. No. 619,606, filed Oct. 6, 1975, and now abandoned.

BACKGROUND OF THE INVENTION

1. Field of the Invention

This invention relates to the art of providing membranes for use in chlor-alkali electrolysis membrane cells, and in particular, to a method of pre-treating said membranes, before their insertion into a cell, to improve the quality of said membranes.

2. Description of the Prior Art

The use of membrane-type electrolysis cells for the electrolysis of brine, producing chlorine, hydrogen, and sodium hydroxide, is well known, as for example, from U.S. Pat. No. 2,967,807. It is well known that such membrane-type cells can be made by using a sheet or film, approximately 0.1 to 0.25 millimeters (about 4 to 10 or 20 mils) thick, of a copolymer of tetrafluoroethylene and sulfonylfluoride perfluorovinyl ether. Suitable materials are disclosed in U.S. Pat. No. 3,282,875, and they are sold under the trademark "NAFION". Such cells offer an attractive alternative to the customary diaphragm-type cells, using a diaphragm made of asbestos or the like, because of the health hazards posed by the manufacture and use of asbestos. It is known that such membranes have a tendency, when put into service, to swell, thereby creating water domains through which hydroxide ions are transported much more readily than sodium ions, owing to the Grotthus mechanism. We are not aware that anyone has hitherto proposed any method or practice, by means of which such swelling of the membrane may be reduced, with corresponding favorable effects upon the effective selectivity of the membranes and upon the current efficiency of the chlor-alkali membrane cells in which they are used.

SUMMARY OF THE INVENTION

By subjecting them to a heat treatment at 100 to 275° Centigrade for a time of several hours to four minutes, membranes for use in chlor-alkali cells are given improved properties: they have improved selectivity, exhibit higher current efficiency and lower power consumption per unit of product, and afford a product having a lower salt content.

DESCRIPTION OF THE PREFERRED EMBODIMENTS

The present invention is practiced upon membranes for use in membrane-type chlor-alkali cells for the electrolysis of brine to produce alkali-metal hydroxide, chlorine, and hydrogen. In particular, it is practiced on membranes that are made of a copolymer of tetrafluoroethylene and sulfonated perfluorovinyl ether, such as a copolymer of tetrafluoroethylene and sulfonylfluoride perfluorovinyl ethers. Such material is sold under the trademark "NAFION" for use in such cells in the form of membranes having a thickness ordinarily on the order of 0.10 to 0.25 millimeters (4 to 10 mils) and having an equivalent weight number on the order of 1000 to 1500. To improve the strength of the membrane, some of the membranes are provided with reinforcement of polytetrafluoroethylene or the like; others are not. Such membranes are useful in their untreated condition, but by the practice of the present invention, their performance can be considerably improved.

In the practice of the invention, a membrane to be treated is preferably placed between a pair of slightly larger thin sheets of polytetrafluoroethylene, to insure against having the membrane adhere to anything with which it is in contact during the thermal treatment. A convenient way of practicing the invention is to heat the sandwich thus prepared to the prescribed temperature, using an oven or a hydraulic press having a pair of electrically heated flat plates. Satisfactory results have been obtained without the exertion of any pressure, but in some instances it has been desirable to use a small pressure, such as 0.976 to 4.88 kilograms per square centimeter (1 to 5 tons per square foot). Pressures as great as 9.76 kilograms per square centimeter (10 tons per square foot) can be used.

The duration of the heat treatment depends upon the temperature. At a high temperature, such as 275° Centigrade, a short time such as four to five minutes is sufficient, whereas at a low temperature such as 100° Centigrade, a time of several hours may be required. More particularly, there may be used a temperature of 175° to 225° Centigrade, for a time of three hours to one half hour. Preferred results are obtained with the use of a temperature of 200° Centigrade for 2 hours.

After the thermal treatment, the membrane is allowed to cool to room temperature. Rapid cooling (one minute or less) is acceptable, but a slower cooling rate (at least 15 minutes, and up to several hours, preferably about 2 or 3 hours) is preferred.

The treated membrane is then inserted into a chlor-alkali cell and used in the same manner as an untreated membrane.

As a result of such thermal treatment, the membranes exhibit improved properties: they have improved selectivity, give higher current efficiencies and lower power consumption per unit of product obtained, and afford a product having a lower salt content.

The underlying reason for these changes is that as a result of the heat treatment, there occurs a morphological transition in the membrane material. This can be seen clearly from X-ray diffraction data upon membranes in their untreated and treated states. Untreated, the membrane is characterized by two lattice constants, one at 5.7 Angstrom units and one at 34 Angstrom units. The former is attributable to the lateral spacing of the polymer chains. The latter is related to the spacing of the sulfonic acid groups. Treated, the membrane exhibits lattice constants of 5.7, 27, and 140 Angstrom units. The X-ray diffraction data demonstrate that the spacing between sulfonic acid groups has been diminished, as is evidenced by the decrease in lattice constant from 34 to 27 Angstrom units. Those skilled in the art of ion-exchange membranes know that closer spacing of sulfonic acid groups means better membrane selectivity.

Moreover, the appearance of an overstructure with a spacing of 140 Angstrom units indicates that, after treatment, there is a more regular ordering of the resin. Those skilled in the art will again appreciate that the more regular ordering can be expected to improve the selectivity of the membrane and its other mechanical and transport properties. Indeed, the treated membrane, as compared to one untreated, was 25% higher in tensile strength and 50% lower in permeability for gases.

The invention described above is illustrated by the following specific examples.

EXAMPLE 1

A 0.125 millimeter (5-mil) thick piece of polytetrafluoroethylene-reinforced membrane material, made of a copolymer of tetrafluoroethylene with sulfonated perfluorovinyl ether and having an equivalent weight number of about 1100, was boiled briefly in a 1 Normal aqueous solution of hydrochloric acid and then removed. In this state, it could have been inserted directly into a chlor-alkali cell. The piece was wiped dry, sandwiched between two sheets of polytetrafluoroethylene, and placed into a hydraulic press that had been preheated to 225° Centigrade. A pressure of 6.83 kilograms per square centimeter (7 tons per square foot) was then applied for a period of five minutes, and the membrane was then allowed to cool in the press after the pressure had been released. This took about 15 minutes. The membrane was removed from between the sheets of polytetrafluoroethylene and inserted into a chlor-alkali cell having dimensionally stable anodes and steel cathodes. The cell was then operated at a cell current of 25 amperes. Saturated brine having a pH of 4 was fed to the anode compartment at a rate of about 200 milliliters per hour, and 80 milliliters per hour of water were fed to the cathode compartment, which produced an 18 weight percent aqueous solution of sodium hydroxide. The cell operated at 3.85 volts and with a current efficiency of 78 percent. The energy consumption was 132 watt-hours per mole of sodium hydroxide.

For comparison, a similar membrane was inserted into a similar chlor-alkali cell, immediately after having been boiled briefly in hydrochloric acid. This chlor-alkali cell was operated under substantially the same conditions, exhibiting a cell voltage of 3.35 volts, a current efficiency of 59 percent, and an energy consumption of 152 watt-hours per mole of sodium hydroxide. The thermal treatment according to the invention increased the current efficiency from 59 percent to 78 percent, and it lowered the energy consumption from 152 to 132 watt-hours per mole.

EXAMPLE 2

Example 1 was repeated, except that (1) the membrane was 0.178 millimeters (7 mils) thick and had an equivalent weight number of 1200, and (2) the temperature used in the thermal treatment was 250° Centigrade. Again, for comparison, the results with an identical but untreated membrane were observed. The treated membrane gave current efficiency of 82 percent, a cell voltage of 3.7 volts, and an energy consumption of 121 watt-hours per mole. When the treated membrane was used for a period of five months, the current efficiency remained at about 80 percent. The untreated membrane gave a current efficiency of 69 percent, a cell voltage of 3.85 volts, and an energy consumption of 149 watt-hours per mole.

EXAMPLE 3

An unreinforced membrane of 1200 equivalent weight number and having a thickness of 0.254 millimeters (10 mils) was thermally treated at 250° Centigrade for five minutes. It was then inserted into a cell, as in Example 1, and used to produce an aqueous solution containing 18 weight percent of sodium hydroxide. The current efficiency was 82 percent, the cell voltage was 3.3 volts, and the energy consumption was 108 watt-hours per mole. The sodium chloride content of the product from the cell containing the treated membrane was 200 milligrams per liter.

In comparison, when a substantially identical but untreated membrane was used, the current efficiency was 64 percent, the cell voltage was 3.1 volts, and the energy consumption was 130 watt-hours per mole. Moreover, the hydroxide product contained 1.5 grams per liter of sodium chloride.

EXAMPLE 4

A copolymerized tetrafluoroethylene and sulfonated perfluorinated vinyl ether membrane of equivalent weight number 1350 was thermally treated at 225° Centigrade for five minutes. When inserted into a cell, the thermally treated membrane gave a cell voltage of 4.0, a current efficiency of 90 percent, and an energy consumption of 120 watt-hours per mole. In comparison, an untreated membrane gave a cell voltage of 3.3, a current efficiency of 68 percent, and an energy consumption of 130 watt-hours per mole.

EXAMPLE 5

Example 3 was repeated, except that the thermal treatment was conducted at 200° Centigrade for four minutes and at a pressure of 2.928 kilograms per square centimeter (three tons per square foot). When tested in a chlor-alkali cell, the resulting membrane gave a current efficiency of 82 percent, the same as in Example 3, in which the untreated membrane had a current efficiency of 64 percent.

EXAMPLE 6

Example 3 was repeated, except that the thermal treatment was conducted in an oven at 200° Centigrade for thirty minutes without any pressure. The membrane was then allowed to cool over a three-hour period. When tested in a chlor-alkali cell, the membrane so treated gave a current efficiency of 78 percent.

EXAMPLE 7

Example 6 was repeated, except that the treatment at 200° Centigrade was for 2 hours. The current efficiency was 81%.

EXAMPLE 8

Example 3 was repeated, except that the thermal treatment was conducted in an oven at 110° Centigrade for a period of four hours. When tested in a chlor-alkali cell, the membrane gave a current efficiency of 77 percent.

In addition, tests were conducted with respect to membranes of 1100 and 1200 equivalent weight number to demonstrate that a thermal treatment in accordance with the present invention yields a membrane which has a decreased tendency to absorb water (in comparison with an untreated membrane). Treated and corresponding untreated membranes were brought to equilibrium in an atmosphere having 50 percent relative humitidy, and the water contents of the membranes were then determined by the base-catalyzed, extrapolated Karl Fischer method. For membranes of 1100 equivalent weight number, the water contents were 8.72 weight percent for the untreated and 7.50 weight percent for the treated, a difference of 14 percent. For membranes of 1200 equivalent weight number, the water contents were 7.45 weight percent for the untreated and 6.55 weight percent for the treated, a difference of 12 percent.

While there have been shown and described herein certain embodiments of the invention, it is intended that there be covered as well as any change or modification therein which may be made without departing from the spirit and scope of the invention.

Membranes treated as herein taught may find other uses in which greater selectivity is wanted.

The embodiments of the invention in which an exclusive property or privilege is claimed are defined as follows:

1. A method for improving the selectivity of a membrane consisting of copolymerized polytetrafluoroethylene and sulfonated perfluorinated polyvinyl ether, in the salt or fill acid form, having an equivalent weight number of approximately 1000 to 1500 and a thickness of approximately 0.1 to 0.5 millimeters, said method comprising the step of thermally treating in a non-aqueous environment said membrane prior to use by subjecting it to a temperature of 100° to 275° Centigrade for a period of several hours to 4 minutes.

2. A method as defined in claim 1 wherein during said step said membrane is subjected to a substantial pressure of up to 9.76 kilograms per square centimeter.

3. A method as defined in claim 2, wherein said step of thermally treating said membrane is conducted at a temperature of 175° to 225° Centigrade for a time of 5 to 12 minutes.

4. A method as defined in claim 1, wherein said step of thermally treating said membrane is conducted at a temperature of 175° to 225° Centigrade for a time of 3 hours to ½ hour.

5. A method as defined in claim 1, wherein said membrane has a thickness of 0.1 to 0.25 millimeters.

6. A membrane made by the method of claim 1.

7. In a method of electrolyzing an alkali-metal halide by subjecting an aqueous solution of said halide to electrolysis in a cell having anode and cathode compartments separated by membrane members consisting of copolymerized tetrafluoroethylene and sulfonated perfluorinated vinyl ether, in the salt or free acid form, having an equivalent weight number of approximately 1000 to 1500 and a thickness of approximately 0.1 to 0.25 millimeters, the improvement which consists in the step of thermally treating in a non-aqueous environment said membrane prior to use in said cell at a temperature of 100° to 275° Centigrade for a period of several hours to 4 minutes.

8. An improvement as defined in claim 7, wherein during said step said membrane is subjected to a pressure of up to 9.76 kilograms per square centimeter.

9. An improvement as defined in claim 8, wherein said step of thermally treating said membrane is conducted at a temperature of 175° to 225° Centigrade for a time of 5 to 12 minutes.

10. An improvement as defined in claim 7, wherein said step of thermally treating said membrane is conducted at a temperature of 175° to 225° Centigrade for a time of 3 hours to ½ hour.

* * * * *

UNITED STATES PATENT AND TRADEMARK OFFICE
CERTIFICATE OF CORRECTION

PATENT NO. : 4,089,759
DATED : May 16, 1978
INVENTOR(S) : Michael Krumpelt and Stanley Tariho Hirozawa It is certified that error appears in the above-identified patent and that said Letters Patent are hereby corrected as shown below:

Claim 1, line 4, delete "fill" and insert therefor --free--.

Signed and Sealed this

Twenty-first Day of November 1978

[SEAL]

Attest:

RUTH C. MASON
Attesting Officer

DONALD W. BANNER
Commissioner of Patents and Trademarks